United States Patent
Qi et al.

(10) Patent No.: US 11,163,058 B2
(45) Date of Patent: Nov. 2, 2021

(54) APPARATUS AND METHOD FOR SECURITY CHECK OF MULTIPLE HUMAN BODIES BASED ON LINEAR FREQUENCY MODULATION

(71) Applicants: SHENZHEN CCT THZ TECHNOLOGY CO., LTD., Shenzhen (CN); CHINA COMMUNICATION TECHNOLOGY CO., LTD., Shenzhen (CN)

(72) Inventors: Chunchao Qi, Shenzhen (CN); Shukai Zhao, Shenzhen (CN); Beibei Liu, Shenzhen (CN); Guangsheng Wu, Shenzhen (CN); Qing Ding, Shenzhen (CN); Xiongwei Huang, Shenzhen (CN); Juncheng Liu, Shenzhen (CN); Chengyan Jia, Shenzhen (CN); Yandong Zhang, Shenzhen (CN); Yanli Liu, Shenzhen (CN)

(73) Assignees: SHENZHEN CCT THZ TECHNOLOGY CO., LTD., Shenzhen (CN); CHINA COMMUNICATION TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/065,998

(22) PCT Filed: Jan. 27, 2016

(86) PCT No.: PCT/CN2016/072413
§ 371 (c)(1),
(2) Date: Jun. 25, 2018

(87) PCT Pub. No.: WO2017/107283
PCT Pub. Date: Jun. 29, 2017

(65) Prior Publication Data
US 2019/0025421 A1    Jan. 24, 2019

(30) Foreign Application Priority Data

Dec. 25, 2015  (CN) .......................... 201510990745.1

(51) Int. Cl.
*G01S 13/88* (2006.01)
*G01S 13/89* (2006.01)
(Continued)

(52) U.S. Cl.
CPC .......... *G01S 13/887* (2013.01); *G01S 13/343* (2013.01); *G01S 13/89* (2013.01); *G01S 7/032* (2013.01); *G01S 7/35* (2013.01)

(58) Field of Classification Search
CPC ......... G01S 13/003; G01S 13/56; G01S 3/781
See application file for complete search history.

(56) References Cited

U.S. PATENT DOCUMENTS

2009/0195435 A1   8/2009  Kapilevich et al.
2016/0294492 A1*  10/2016 Mostofi ................ H04B 17/318

FOREIGN PATENT DOCUMENTS

CN   104375143   2/2015
CN   205450266   8/2016

OTHER PUBLICATIONS

Sheen, McMakin, Hall, "Three-dimensional millimeter-wave imaging for concealed weapon detection". —IEEE Transactions on Microwave Theory and Techniques, vol. 49, No. 9, Sep. 2001.

* cited by examiner

*Primary Examiner* — Timothy A Brainard
(74) *Attorney, Agent, or Firm* — Maier & Maier, PLLC

(57) ABSTRACT

This invention provides a security check apparatus for multiple human bodies based on linear frequency modulation, which comprises a scanning device, a millimeter wave signal transceiver module, and an image processing unit. The scanning device comprises several detection seats and (Continued)

several guideways and motors arranged on the detection seats; the detection seats are configured to accommodate persons to be security checked; a set of the millimeter wave signal transceiver modules are arranged on each guideway, and each millimeter wave signal transceiver module is driven by the motor to move along the guideway; the several detection seats are arranged in longitudinal direction. The millimeter wave signal transceiver modules are configured to transmit millimeter wave signals to the persons to be security checked and receive millimeter wave signals reflected from the persons to be security checked. The image processing unit is configured to perform holographic 3D imaging on the human bodies of the persons to be security checked based on the reflected millimeter wave signals to obtain 3D images of the human bodies. This invention also provides a security check method for multiple human bodies based on linear frequency modulation. This invention has the advantages of low cost, simple structure, easy integration, high resolution, more persons are detected per unit time, and no radiation hazard to human bodies.

14 Claims, 5 Drawing Sheets

(51) Int. Cl.
  *G01S 13/34* (2006.01)
  *G01S 7/03* (2006.01)
  *G01S 7/35* (2006.01)

APPARATUS AND METHOD FOR SECURITY CHECK OF MULTIPLE HUMAN BODIES BASED ON LINEAR FREQUENCY MODULATION

TECHNICAL FIELD

Aspects of the present disclosure relate to a human body security check system, and more particularly, to a security check apparatus and method for multiple human bodies based on linear frequency modulation.

BACKGROUND

Millimeter wave is an electromagnetic wave with the wavelength from 1 mm to 10 mm, and the frequency is between 30 GHz to 300 GHz. In practical engineering applications, the low end frequency of millimeter wave is usually lowered to 26 GHz. In the electromagnetic spectrum, millimeter wave is in the overlapped wavelength range between microwave and far infrared wave, so millimeter wave has the spectrum characteristics of both microwave and far infrared wave. Compared with microwave, millimeter wave can obtain higher spatial resolution and stronger anti-interference capability due to the characteristics of narrow beam and easy to achieve high gain antenna. Meanwhile, a millimeter wave system can restrain multipath effect due to too small detection elevation in a microwave system. On the other hand, millimeter wave has strong capability of penetrating plasma, large doppler frequency shift, high velocity measurement sensitivity. Besides, a millimeter wave device is small in size, light in weight, so millimeter wave system is easier to integrate. Compared with infrared wave and laser, the attenuation of millimeter wave transmitted in atmospheric is small, and natural light and heat radiation source have almost no influence on it. In harsh conditions, such as mist and smoke, infrared wave and laser cannot work normally, but millimeter wave can work in all-weather condition. It is these unique characteristics that give extensive application prospects to millimeter wave technology, especially in the security check field.

With the deterioration of national security and anti-terrorism situation, persons' security check in public places becomes more important. For a long time, metal security doors are widely used in the human body security check of public places to detect the metal objects carried by human body. However, it cannot cope with nonmetal objects and weapons such as explosive, nonmetal knife tools, liquid hazardous articles. The human body security check imaging device "naked body scanner" is based on the characteristic that X-ray can penetrate multiple materials, such as clothes and human skin. X-ray can also detect hazardous articles carried by human body effectively. However, X-ray bringing health problem has long been at disputation. According to research reports, X-ray's ionizing radiation can inhibit cell growth, destroy cell and even cause necrocytosis. Research work has demonstrated that, a small number of cancers emerge in hundreds of millions of scanned passengers every year. Based on the above reasons, many countries require not to use "naked body scanner" in public places as possible. Therefore, millimeter wave human body scanning imaging security check device, which has the advantages of fast, safety, reliability and privacy protection, has been widely used and plays an important and irreplaceable role in person security check.

Millimeter wave imaging mechanism comprises passive millimeter wave imaging and active millimeter wave imaging. The advantages of passive millimeter wave imaging system are simple structure and low implementation cost, and the disadvantages are too long imaging time and inferior imaging resolution. With the development of millimeter wave device technology and the improvement of millimeter wave device level, active millimeter wave imaging is gaining more and more attention. Active millimeter wave imaging comprises two mechanisms of synthetic aperture imaging and holographic imaging. The millimeter wave holography imaging derives from optical holography principle, that is, using electromagnetic wave's coherence principle. First, a transmitter transmits high-stability millimeter wave signals to an object to be detected. A receiver receives echo signals from the object and performs coherent processing with highly coherent signals to extract the amplitude and phase information of the echo signals, so as to obtain the scattering characteristics of the object. Finally, the object millimeter wave image in the scene is obtained by the method of data and image processing. The millimeter wave image obtained by active millimeter wave holography imaging has high resolution, and if matched by mechanical scanning, the imaging time can be reduced greatly and the engineering is realized. Therefore, millimeter wave holography imaging is especially suitable for millimeter wave short range active imaging.

In view of the above, the main drawbacks of existing security check imaging devices are those: "naked body scanner" based on X-ray is easy to miss nonmetal objects and weapons such as explosive, nonmetal knife tools, liquid hazardous articles and damages human body seriously; passive millimeter wave imaging system has slow imaging speed and inferior resolution.

SUMMARY

The objective of this invention is to solve the problems of X-ray security check imaging device's high miss rate and damage to human body and passive millimeter wave imaging system's slow imaging speed and inferior resolution.

In order to solve the above problems, according to an aspect, this invention provides a security check apparatus for multiple human bodies based on linear frequency modulation, which comprises a scanning device, a millimeter wave signal transceiver module, and an image processing unit.

the scanning device comprises several detection seats and several guideways and motors arranged on the detection seats; the detection seats are configured to accommodate persons to be security checked; a set of the millimeter wave signal transceiver modules are arranged on each guideway, and each millimeter wave signal transceiver module is driven by the motor to move along the guideway; the several detection seats are arranged in longitudinal direction;

the millimeter wave signal transceiver module is configured to transmit millimeter wave signals to the persons to be security checked and receive millimeter wave signals reflected from the persons to be security checked;

the image processing unit is configured to perform holographic 3D imaging on the human bodies of the persons to be security checked based on the reflected millimeter wave signals to obtain 3D images of the human bodies.

Further, the security check apparatus for multiple human bodies based on linear frequency modulation further comprises an alarm unit. The alarm unit is configured to compare the 3D images of human bodies with a prestored standard safe human body 3D image to check whether it matches; and if it does not match, the alarm unit raises alarm.

Further, each millimeter wave signal transceiver module comprises a number of millimeter wave signal transmitting units and corresponding millimeter wave signal receiving units; each millimeter wave signal transmitting unit comprises a millimeter wave signal transmitting module and a transmitting antenna connected to it; each millimeter wave signal receiving unit comprises a millimeter wave signal receiving module and a receiving antenna connected to it; all the transmitting antennas of the millimeter wave signal transceiver module constitute a transmitting antenna array; and all the receiving antenna of the millimeter wave signal transceiver module constitute a receiving antenna array;

each millimeter wave signal transceiver module moves on the guideway in uniform motion around the body outline of the checked person on the detection seat.

Further, in the above detection seats, guideways, which are placed on the surface in contact with human bodies, are called rear detection guideway set; guideways, which are arranged on the detection seat back facing a subsequent seat, are called front detection guideway set; a set of millimeter wave signal transceiver module is respectively arranged in the rear detection guideway set and the front detection guideway set; the millimeter wave signal transceiver module in the rear detection guideway set is used to transmit and receive the millimeter wave signals corresponding to the rear of the detected person in this detection seat; the millimeter wave signal transceiver module in the front detection guideway set is used to transmit and receive the millimeter wave signals corresponding to the front of the checked person in a subsequent seat.

Further, the millimeter wave signal transmitting module comprises a first independent signal source, a first directional coupler, a first power amplifier, and a first frequency doubler;

the output signal of the first independent signal source is sent to the input end of the first directional coupler; the straight-through output end of the first directional coupler is connected to the input end of the first power amplifier, the output end of the first power amplifier is connected to the input end of the first frequency doubler, and the output end of the first frequency doubler is connected to the transmitting antenna.

Further, the millimeter wave signal receiving module comprises a second independent signal source, a second directional coupler, a first mixer, a second power amplifier, a second frequency doubler, a second mixer, a third power amplifier, a third frequency doubler, a third mixer, and a low noise amplifier;

the output signal of the second independent signal source is sent to the input end of the second directional coupler; the straight-through end of the second directional coupler is connected to the intermediate frequency input end of the first mixer; the coupling port of the first directional coupler is connected to radio frequency input end of the first mixer; the local oscillation output end of the first mixer is connected to the input end of the second power amplifier; the output end of the second power amplifier is connected to the input end of the second frequency doubler; the output end of the second frequency doubler is connected to the local oscillation input end of the second mixer; the radio frequency input end of the second mixer is connected to the receiving antenna; the intermediate frequency output end of the second mixer is connected to the radio frequency input end of the third mixer;

the coupling port of the second directional coupler is connected to the input end of the third power amplifier; the output end of the third power amplifier is connected to the input end of the third frequency doubler; the output end of the third frequency doubler is connected to the local oscillation input end of the third mixer; the intermediate frequency output end of the third mixer is connected to the input end of the low noise amplifier; the output end of the low noise amplifier is connected to the image processing unit.

Further, the first independent signal source is a frequency modulation signal source with a working frequency of 18.5 GHz-21.5 GHz.

Further, the security check apparatus for multiple human bodies based on linear frequency modulation further comprises a microcontroller and a single pole multiple throw switch connected to the power output end of the power supply unit of the second independent signal source and the first independent signal source; and the microcontroller is used to control the on-off of the single pole multiple throw switch.

Further, the second independent signal source is a dot frequency voltage-controlled oscillation source with a working frequency of 50 MHz.

Further, the image processing unit comprises a data acquisition and processing module and an image display unit;

the data acquisition and processing module is used to acquire echo signals from the low noise amplifier and obtain the 3D image of the checked person by Fourier transform and inverse Fourier transform; and the image display unit is used to display the human body's 3D image.

Further, in the detection seat, the guideways are arranged on the surfaces in contact with the checked person.

According to another aspect, this invention provides a security check method for multiple human bodies based on linear frequency modulation, comprising the following steps:

(1) the motor drives millimeter wave signal transceiver modules on the guideways to do uniform linear motion, the transmitting antenna in the millimeter wave signal transceiver module transmits millimeter waves to the human bodies of the persons to be security checked in the detection seats to perform millimeter-wave scanning on human bodies;

(2) meanwhile, the receiving antennas in the millimeter wave signal transceiver module receives echo signals with target information reflected from human bodies; the echo signals are sent to the data acquisition and processing module of the image processing unit through the millimeter wave signal receiving module of the millimeter wave signal transceiver module;

(3) after acquiring data, the data acquisition and processing module of the image processing unit restores the human body image information in the echo signals by Fourier transform and inverse Fourier transform;

(4) the above human body image information is compared with a prestored standard safe human body 3D image to check whether it matches; and if it matches, then the person passes the security check.

Further, in the step (4), if it does not match, the alarm in the alarm unit raise an audible alarm.

Further, step (3) of restoring the human body image information in the echo signals comprises the following steps:

suppose the received echo signal is:

$$E(X, Y, \omega) = \int\int\int \frac{1}{r} f(x, y, z) e^{(-j\vec{K}\vec{r})} dxdydz, \quad (A)$$

wherein $\vec{r}$ is the distance between the receiving antenna and the target, $\vec{K}$ is the electromagnetic beam, and the exponent part represents the spherical wave scattered by the target; in the equation (A), $\vec{K}\vec{r}=(x-X)\vec{K}_x+(y-Y)\vec{K}_y+(z-Z)\vec{K}_z$ (B), substituting equation (B) to equation (A), then $E(X,Y,\omega) = \iiint f^F(K_x,K_y,K_z) e^{(-jZ_0K_z)} e^{[j(XK_x+YK_y)]} dK_x dK_y$ (C); a Fourier transform is adopted in the equation (C), $f^F(K_x, K_y, K_z) = FT_3[f(x,y,z)] = \iiint (x,y,z) e^{[-j(xK_x+yK_y+zK_z)]} dxdydz$ (D), substituting equation (D) to equation (C), then $E(X,Y,\omega) = IFT_2\{FT_3[f(x,y,z)] e^{(-jZ_0K_z)}\}$ (E), an inverse Fourier transform is adopted in the equation (E), then a human body image is obtained:

$$f(x, y, z) = IFT_3\{FT_2[E(X, Y, \omega)] e^{(jZ_0K_z)}\}.$$

$$\sigma(x, y, z) = F^{-1}_{(k_x,k_y,k_z)}\{F^{-1}_\xi [S(\omega, \xi, k_z) e^{-j\sqrt{4k_F^2R^2-\xi^2}}]\}.$$

Compared with existing millimeter wave imaging scanners, this invention has the following notable advantages:

(1) low cost: driving motors used in this invention makes one-dimensional array antennas to achieve the scanning effect of planar array, which reduces cost greatly.

(2) simple structure and easy integration: this invention adopts a single-pole multiple throw switch to control the work sequence of channels, and uses a frequency modulation signal source and millimeter wave devices to build system, which reduces the system's complexity greatly and improves the system's integration level.

(3) high resolution: frequency modulated continuous wave technology, superheterodyne technology and holographic imaging technology are used in this invention to improve the planar resolutions and depth resolution of a 3D image.

(4) more persons are detected per unit time. Active millimeter wave imaging is used in this invention, and the imaging is fast. Furthermore, in this invention, four persons can be detected at a time, which greatly increases the number of persons detected per unit time.

(5) no radiation hazard to human bodies. The invention adopts millimeter wave for imaging, and millimeter wave is different from X-ray which has harmful ionizing radiation, and thus is healthy and safe for the detected persons.

BRIEF DESCRIPTION OF THE ATTACHED DRAWINGS

Figure 1:
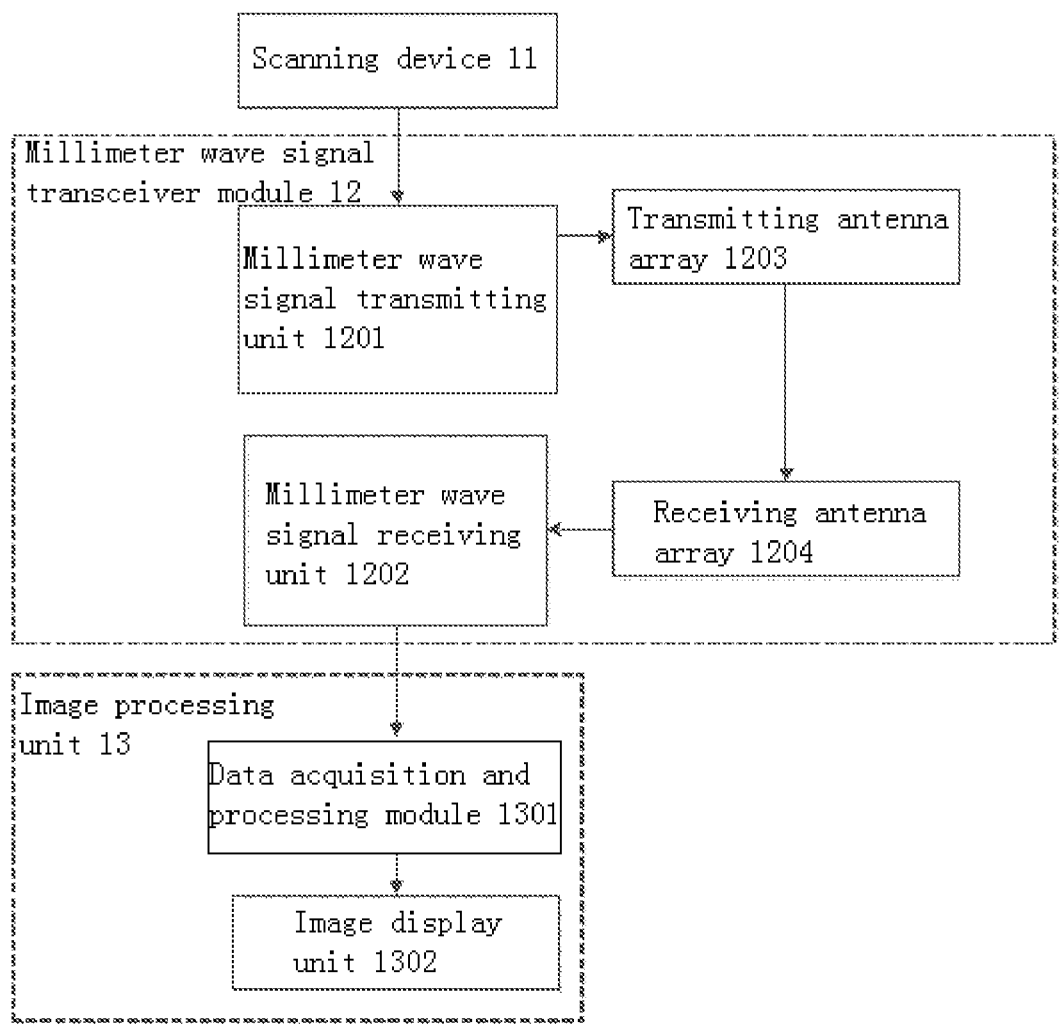
FIG. 1 illustrates a functional block diagram of the apparatus according to an embodiment of this invention.

In the above figures, scanning device 11; millimeter wave signal transceiver module 12; millimeter wave signal transmitting unit 1201; millimeter wave signal receiving unit 1202; transmitting antenna array 1203; receiving antenna array 1204; image processing unit 13; data acquisition and processing module 1301; image display unit 1302; alarm unit 14;

detection seat 20; guideway surfaces 201, 202, 203, and 204; guideways 205, 206, 207, and 208, motor 209; person to be security checked 210;

detection seats 301, 302, 303, 304, and 305;

first independent signal source 401; second independent signal source 402; first directional coupler 404; second directional coupler 405; first mixer 406, first power amplifier 407; second power amplifier 408; third power amplifier 409; first frequency doubler 410; second frequency doubler 411; third frequency doubler 412; second mixer 413; third mixer 414; low noise amplifier 415; transmitting antenna 416; receiving antenna 417 and 601; person to be security checked 602.

DETAILED DESCRIPTION

The invention is further described in conjunction with appended drawings. These drawings are simplified diagrams and are merely used to illustrate the basic structure of this invention. Therefore, only structures that related to this invention are displayed.

Figure 3:
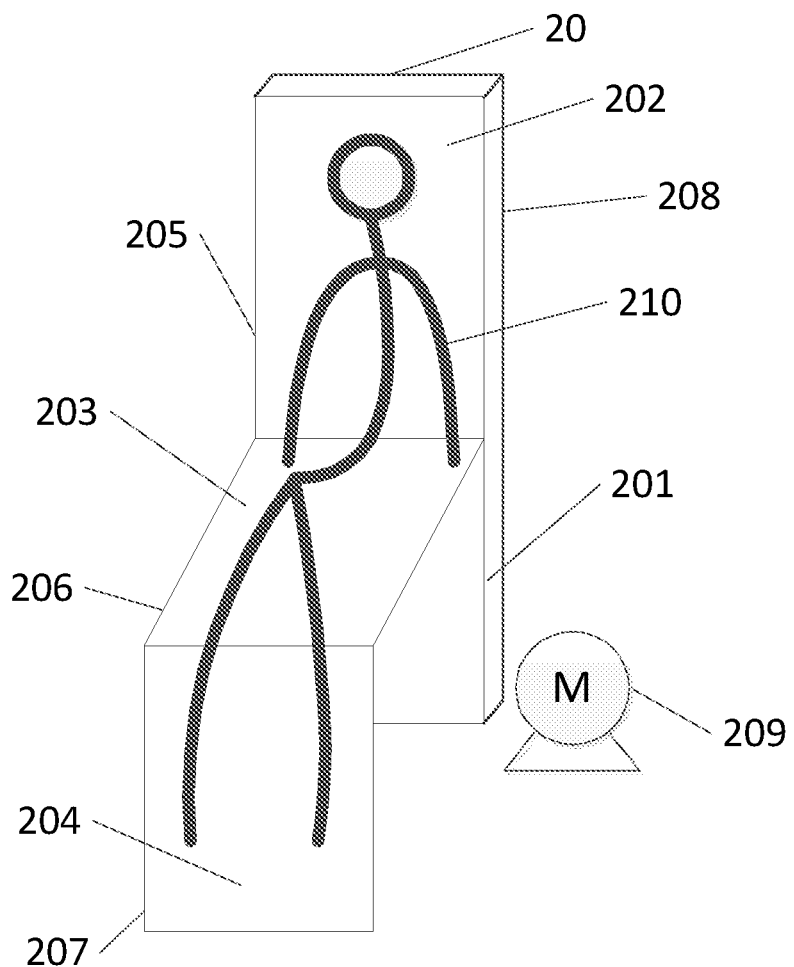
FIG. 3 illustrates a diagram of the scanning device of single detection seat of the apparatus according to this invention.
Figure 4:
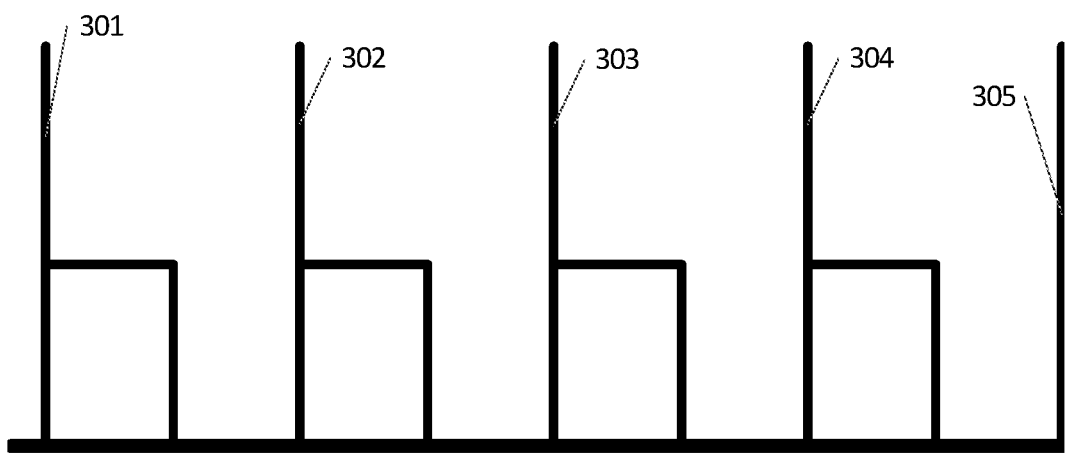
FIG. 4 illustrates a layout diagram of multiple seats for multiple-person security check.

As illustrated in FIG. 1, the security check apparatus for multiple human bodies based on linear frequency modulation according to this invention comprises a scanning device 11, a millimeter wave signal transceiver module 12, and an image processing unit 13. The scanning device 11 comprises multiple detection seats, such as five detection seats 301, 302, 303, 304, and 305 arranged in longitudinal direction as illustrated in FIG. 4. In the above detection seats, guideways (i.e., guideways 205, 206, and 207 in FIG. 3), which are placed on the surfaces (i.e., surfaces 202, 203, and 204) in contact with human bodies, are called rear detection guideway set. A guideway (i.e., guideway 208 in FIG. 3), which is arranged on the detection seat back facing a subsequent seat (i.e., surface 201 in FIG. 3), is called front detection guideway set. A millimeter wave signal transceiver module 12 is respectively arranged in the rear detection guideway set and the front detection guideway set. The millimeter wave signal transceiver module 12 in the rear detection guideway set is used to transmit and receive the millimeter wave signals corresponding to the rear of the detected person in this detection seat. The millimeter wave signal transceiver module 12 in the front detection guideway set is used to transmit and receive the millimeter wave signals corresponding to the front of the detected person in a subsequent seat. As illustrated in FIG. 3, guideways 205, 206, 207, and 208 are arranged on the side face 201 and surfaces 202, 203, and 204 of each detection seat 20 respectively in contact with the back, the hip and the legs of the detected person 210. A millimeter wave signal transceiver module 12 is mounted on each guideway. A drive motor 209 is used to drive the millimeter wave signal transceiver module 12 to do uniform linear motion along the guideway, so that the millimeter wave signal transceiver module 12 can scan human body fully. The millimeter wave signal transceiver module 12 comprises a number of millimeter wave signal transmitting units and corresponding millimeter wave signal receiving units, preferably comprises 64 millimeter wave signal transmitting units and 64 corresponding millimeter wave signal receiving units. As illustrated in FIG. 1, each millimeter wave signal transmitting unit comprises a millimeter wave signal transmitting module 1201 and a transmitting antenna connected to it. All the transmitting antennas of a millimeter wave signal transceiver module 12 constitute a transmitting antenna array 1203. Each millimeter wave signal receiving unit comprises a millimeter wave signal receiving module 1202 and a receiving antenna connected to it. All the receiving antenna of a millimeter wave signal transceiver module 12 constitute a receiving antenna array 1204. The image processing unit 13 comprises a data acquisition and processing module 1301 and an image display unit 1302.

Figure 5:
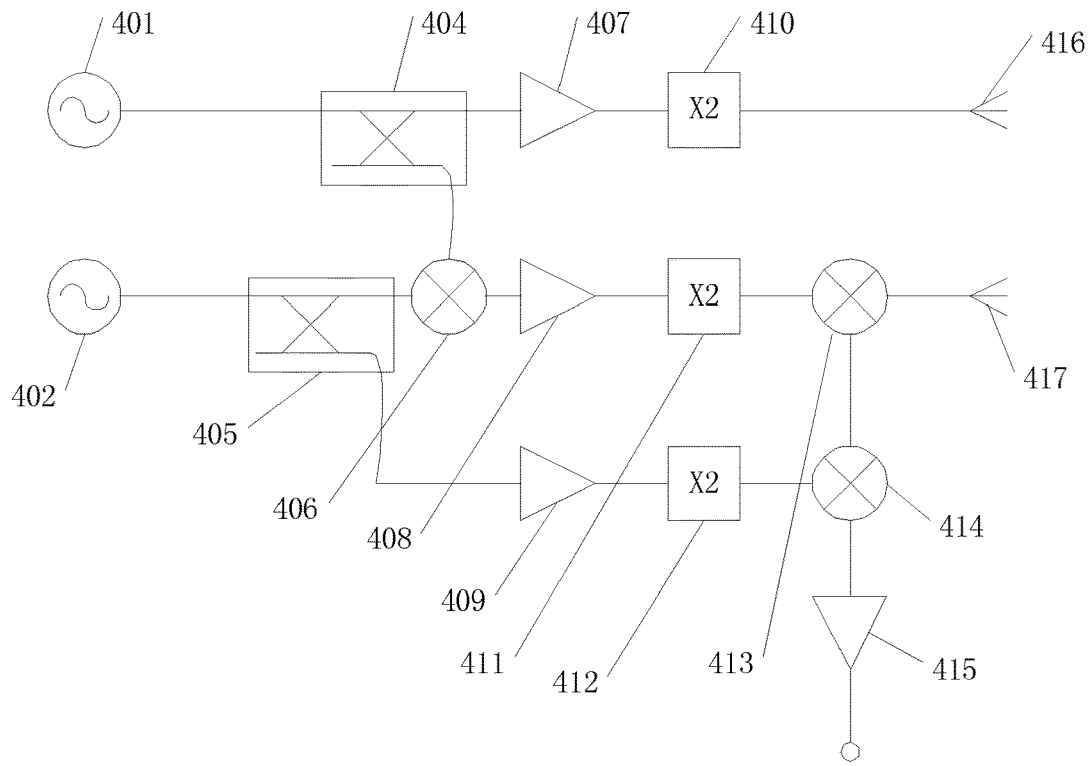
FIG. 5 illustrates a schematic diagram of the superheterodyne millimeter wave signal transceiver unit.

FIG. 5 illustrates a schematic diagram of a transceiving unit in the millimeter wave signal transceiver module 12. Here, the transceiving unit is a superheterodyne millimeter wave signal transceiving unit, wherein the millimeter wave signal transmitting unit comprises a first independent signal source 401, a first directional coupler 404, a first power amplifier 407, a first frequency doubler 410 and a transmitting antenna 416. The first independent signal source 401 is a frequency modulation signal source with a working frequency of 18.5 GHz-21.5 GHz, and its output signal is sent to the input end of the first directional coupler 404. The straight-through output end of the first directional coupler 404 is connected to the input end of the first power amplifier 407, the output end of the first power amplifier 407 is connected to the input end of the first frequency doubler 410, and the output end of the first frequency doubler 410 is connected to the transmitting antenna 416.

The millimeter wave receiving unit comprises a second independent signal source 402, a second directional coupler 405, a first mixer 406, a second power amplifier 408, a second frequency doubler 411, a second mixer 413, a third power amplifier 409, a third frequency doubler 412, a third mixer 414, a low noise amplifier 415, and a receiving antenna 417. The second independent signal source 402 is a dot frequency voltage-controlled oscillation source with a working frequency of 50 MHz, and its output signal is sent to the input end of the second directional coupler 405. The straight-through output end of the second directional coupler 405 is connected to the intermediate frequency input end of the first mixer 406. The coupling port of the first directional coupler 404 is connected to radio frequency input end of the first mixer 406. The local oscillation output end of the first mixer 406 is connected to the input end of the second power amplifier 408. The output end of the second power amplifier 408 is connected to the input end of the second frequency doubler 411. The output end of the second frequency doubler 411 is connected to the local oscillation input end of the second mixer 413. The radio frequency input end of the second mixer 413 is connected to the receiving antenna 417. The intermediate frequency output end of the second mixer 413 is connected to the radio frequency input end of the third mixer 414. The coupling port of the second directional coupler 405 is connected to the input end of the third power amplifier 409. The output end of the third power amplifier 409 is connected to the input end of the third frequency doubler 412. The output end of the third frequency doubler 412 is connected to the local oscillation input end of the third mixer 414. The intermediate frequency output end of the third mixer 414 is connected to the input end of the low noise amplifier 415. The output end of the low noise amplifier 415 is connected to the image processing unit 13.

Figure 2:
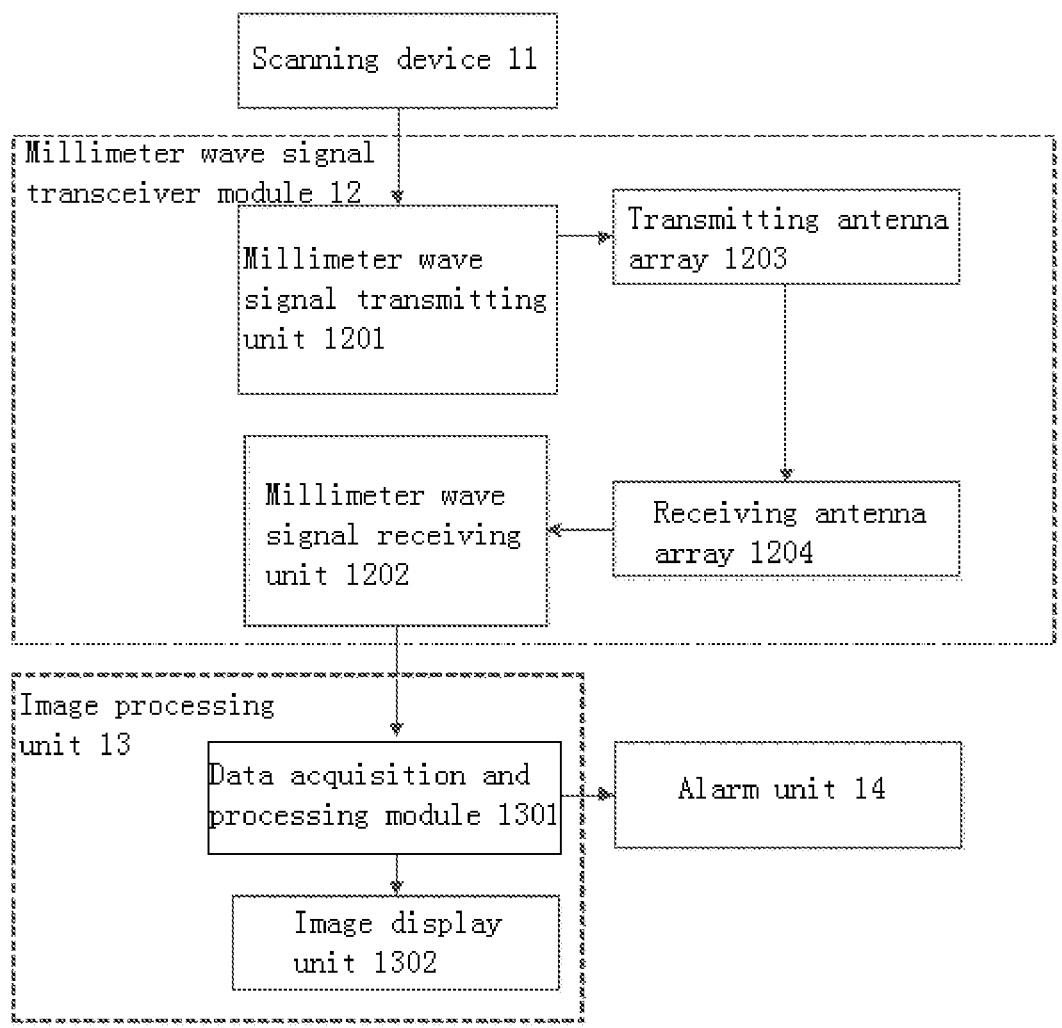
FIG. 2 illustrates a functional block diagram of the apparatus according to another embodiment of this invention.

The difference between the embodiment illustrated in FIG. 2 and that illustrated in FIG. 1 is that: an alarm unit 14 is added. The alarm unit 14 is connected to the data acquisition and processing module 1301. If after comparing, the human body 3D image obtained by the data acquisition and processing module 1301 fails to match with the pre-stored safe human body 3D image, the alarm unit 14 raises the alarm.

Figure 6:
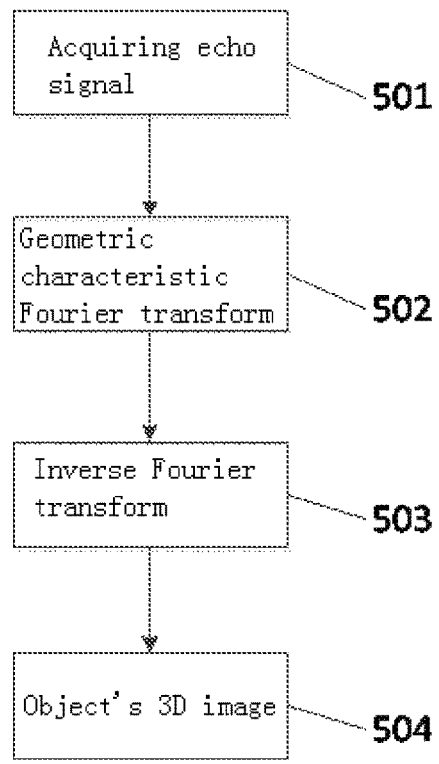
FIG. 6 illustrates a flow diagram of the imaging algorithm according to this invention.

The data acquisition and processing module 1301 of the image processing unit 13 is used to acquire echo signals from the low noise amplifier 415 and obtain the 3D image of the detected person 210 by Fourier transform and inverse Fourier transform. The image display unit 1302 is used to display the human body's 3D image. FIG. 6 illustrates a flow diagram of the imaging algorithm according to this invention. First, the data acquisition and processing module 1301 acquires the echo information from the obtained signal (step 501) and associates it with spatial position signal. Then, a geometric characteristic Fourier transform is performed on it (step 502). Next, an inverse Fourier transform is performed on it after simplification and transformation (step 503). Finally, an object's 3D image is obtained (step 504). Combining with spatial domain position information, a final data is obtained to restore the object's 3D image.

Preferably, the security check apparatus for multiple human bodies based on linear frequency modulation according to this invention further comprises a microcontroller (not shown) and a single-pole multiple throw switch (not shown) connected to the power output end of the power supply unit (not shown) of the second independent signal source 402 and the first independent signal source 401. The microcontroller is used to control the on-off of the single-pole multiple throw switch. As a result, each millimeter wave signal transceiving unit in the millimeter wave signal transceiver module on each guideway can work independently under the control of the single-pole multiple throw switch. That is, not all millimeter wave signal transceiving units work at the same time, which greatly reduces system power consumption.

Taking each millimeter wave signal transceiver module 12 of the apparatus according to this invention having 64 transceiving channels as an example, when this apparatus performs security check, multiple persons to be security checked 210 can sit on multiple detection seats 20 to check at the same time. Generally, following steps are comprised.

Step 1: the motor 209 drives each millimeter wave signal transceiver module 12 on the guideways 205, 206, 207, and 208 to do uniform linear motion at the same time to scan the front and back of the persons to be security checked 210. 64 transmitting antennas 416 in the millimeter wave signal transceiver module 12 constitute a transmitting antenna array 1203. The transmitting antenna array 1203 transmits millimeter waves to the persons to be security checked 210 to perform an all-around millimeter-wave scanning.

Step 2: Meanwhile, the receiving antenna array 1204 constituted by 64 receiving antennas 417 in each millimeter wave signal transceiver module 12 receives echo signals with target information reflected from human bodies. Echo signals are sent to the data acquisition and processing module 1301 of the image processing unit 13 through the millimeter wave signal receiving module 1202 of the millimeter wave signal transceiver module 12. Preferably, the single-pole multiple throw switch (not shown) connected to the power output end of the power supply unit (not shown) of the second independent signal source 402 and the first independent signal source 401 is controlled by the microcontroller (not shown) to switch on 64 transceiving channels in order. That is, a first transceiving channel constituted by a first millimeter wave signal transmitting unit and a corresponding first millimeter wave signal receiving unit is first switched on. After the first transceiving channel accomplishes transceiving, the first transceiving channel is switched off. Then, a second transceiving channel constituted by a second millimeter wave signal transmitting unit and a corresponding second millimeter wave signal receiving unit is switched on, and so on, until the 64$^{th}$ transceiving channel, repeating in this way.

Step 3: After acquiring data, the data acquisition and processing module 1301 of the image processing unit 13 restores the human body image information in the echo signals by Fourier transform and inverse Fourier transform.

Step 4: the above human body image information is compared with a prestored standard safe human body 3D image to check whether it matches; and if it matches, i.e., there is no suspicious area in the human body image information, then the person passes the security check; if it does not match, i.e., there is suspicious area in the human body image information, the alarm in the alarm unit raise an audible alarm, and the checked person is manually detected to rule out security risk.

Security inspection is performed on next persons, repeating in this way.

For example, the first independent signal source 401 is a frequency modulation signal source with a working frequency of 18.5 GHz-21.5 GHz, which can be expressed as:

$$S_1(t) = A_1 \cos\left[2\pi\left(f_1 t + \frac{B}{2T}t^2\right) + \phi_1\right] \quad (1)$$

wherein $A_1$ represents the initial amplitude, $\phi_1$ is the initial phase of the signal source 401, B is the bandwidth of a frequency modulated signal, and T is the frequency modulation cycle. Its output signal is input to the input end of the first directional coupler 404. The second independent signal source 402 is a continuous wave signal source with a working frequency of 50 MHz, which is expressed as:

$$S_2(t) = A_2 \cos(2\pi f_2 t + \phi_2) \quad (2)$$

The second independent signal source 402 is a monofrequency continuous wave signal source of fixed frequency, and its initial amplitude and phase are $A_2$ and $\phi_2$ respectively, the frequency is $f_2$. Its output signal is input to the input end of the second directional coupler 405. The first directional coupler 404 is a three-port device, and its straight-through port is connected to the first power amplifier 407, so that this link's power reaches a safe input power range of the first frequency doubler 410. After the first frequency doubler 410, the input frequency of this link is doubled to 37 GHz-43 GHz and is finally radiated to space by a transmitting antenna 416. Transmitting signal of this time can be expressed as:

$$S_1'(t) = A_1' \cos\left[2\pi\left(f_1 t + \frac{B}{T}t^2\right) + 2\phi_1\right] \quad (3)$$

The first mixer 406 is a three-port device, and the three ports are respectively radio frequency (RF) port, local oscillation (LO) port and intermediate frequency (IF) port. The IF port is connected to the straight-through port of the second directional coupler 405 for inputting an intermediate frequency signal of 50 MHz. The RF port is connected to the coupling port of the first directional coupler 404 for inputting a frequency modulation signal of 18.5 GHz-21.5 GHz. The LO port outputs a difference frequency signal of the RF port and the IF port, and input it the second power amplifier 408, so that the signal's power is amplified to a safe work range of the second frequency doubler 411. At this time, signal output from the second frequency doubler 411 is a signal after mixing two signal sources and doubling, which is expressed as:

$$S(t) = \frac{A_1' A_2'}{2} \cos\left\{2\pi\left[2(f_1 t - f_2 t) + \frac{B}{T}t^2\right] + 2(\phi_1 - \phi_2)\right\} \quad (4)$$

The second mixer 413 is a three-port device, and the three ports are respectively RF port, LO port and IF port. The LO port receives the output signal S(t) of the second frequency doubler 411. The RF port inputs the target reflected echo signal received by the receiving antenna 417. At this time, the echo signal can be expressed as:

$$S_1'(t) = \alpha A_1' \cos\left\{2\pi\left[2f_1(t-\tau) + \frac{B}{T}(t-\tau)^2\right] + 2\phi_1\right\} \quad (5)$$

wherein $\alpha$ is the attenuation coefficient of the echo signal, $\tau=2R/c$ is the echo delay of detecting object, and c is electromagnetic wave's propagation velocity in space.

The IF port of the second mixer 413 outputs the superheterodyne signal of the LO port and the RF port, and this signal has a certain spatial target information, which can be expressed as:

$$S_{IF}(t) = \alpha \frac{A_1' A_2'}{2} \cos\left\{2\pi\left[2f_1(t-\tau) - 2f_2 + \frac{B}{T}(t-\tau)^2\right] + 2\phi_1 - 2\phi_2\right\} \quad (6)$$

The incoherence of two signal sources can be observed from equation (6). In order to acquire a coherent signal, the third mixer 414 is introduced. The third mixer 414 outputs a superheterodyne signal with target coherent information. Its RF port inputs a first down-converted signal $S_{IF}(t)$, and its LO port is input a 100 MHz continuous wave signal from the second independent signal source 402 through the coupling port of the second directional coupler 405, the third power amplifier 409 and the third frequency doubler 412, that is:

$$S_2' = A_2' \cos(4\pi f_2 + 2\phi_2) \quad (7)$$

The IF port of the third mixer 414 outputs a second down-converted signal $S_{IF}'(t)$ with target information, that is:

$$S_{IF}'(t) = \alpha \frac{A_1' A_2'}{8} \cos\left[2\pi\left(2\frac{B}{T}\tau t - \frac{B}{T}\tau^2 + 2f_1 \tau\right)\right] \quad (8)$$

According to equation (8), this method eliminates unsynchronized phase introduced by incoherent double signal sources. The low noise amplifier 415 can amplify the weak intermediate frequency signal down-converted twice to improve the output signal's signal to noise ratio and detection sensitivity. The output signal is sent to the data acquisition and processing module 1301.

Figure 7:
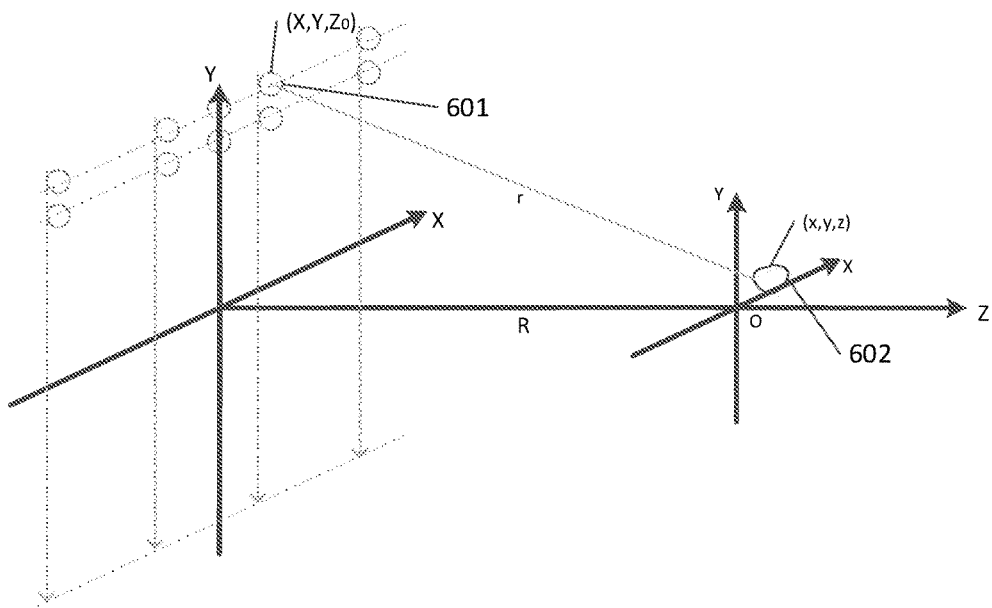
FIG. 7 illustrates an imaging schematic diagram according to this invention.

As illustrated in FIG. 7, after a millimeter wave is scattered by a checked person 602 at position (x,y,z), a receiving antenna 601 at position $(X,Y,Z_0)$ begins to receive the wideband echo signals. The receiving antenna 601 sends the received signals to a millimeter wave circuit to be down-converted with highly coherent local oscillation signals, and then pass through the low noise amplifier 415. Suppose the obtained signal is $E(X,Y,\omega)$, wherein $\omega$ is the instantaneous angular frequency of the transmitting source. $E(X,Y,\omega)$ is a function of $\omega$, and its equation is:

$$E(X, Y, \omega) = \int\int\int \frac{1}{r} f(x, y, z) e^{(-j\vec{K}\vec{r})} dx dy dz \quad (9)$$

wherein $\vec{r}$ is the distance between the antenna and the target, $\vec{K}$ is the electromagnetic beam, and the exponent part represents the spherical wave signal scattered by the target and plays an important role in target 3D scattering imaging. Furthermore, $$\vec{K}\vec{r} = (x-X)\vec{K_x} + (y-Y)\vec{K_y} + (z-Z)\vec{K_z} \quad (10)$$

wherein $E(X,Y,\omega)$ is a time domain signal, which is equation after performing Fourier transform on the time dimension signal $E(X,Y,t)$, i.e., $$E(X,Y,\omega) = FT[E(X,Y,t)] \quad (11)$$

Equation (10) is substituted to equation (9), and the vector calculation of equation (9) is simplified to scalar calculation. To understand from physical significance, it can be seen as expanding a spherical wave as the superposition of plane waves. Then the following equation is obtained:

$$E(X,Y,\omega) = \iiint f^F(K_x,K_y,K_z) e^{(-jZ_0 K_z)} e^{[j(XK_x + YK_y)]} dK_x dK_y \quad (12)$$

A 3D Fourier transform is used in equation (12), that is:

$$f^F(K_x,K_y,K_z) = FT_3[f(x,y,z)] = \iiint f(x,y,z) e^{[-j(xK_x + yK_y + zK_z)]} dx dy dz \quad (13)$$

which is also an inverse Fourier transform, i.e., $$E(X,Y,\omega) = IFT_2\{f^F(K_x,K_y,K_z) e^{(-jZ_0 K_z)}\} \quad (14)$$

The constant term in equation (13) is ignored, and equation (13) is substituted to equation (12) to obtain the following equation:

$$E(X,Y,\omega) = IFT_2\{FT_3[f(x,y,z)] e^{(-jZ_0 K_z)}\} \quad (15)$$

An inverse Fourier transform is performed on equation (15), and a final millimeter wave holography equation is obtained:

$$f(x,y,z) = IFT_3\{FT_2[E(X,Y,\omega)] e^{(jZ_0 K_z)}\} \quad (16)$$

According to equation (16), as long as the electromagnetic information of the echo signal from each frequency point is obtained, $f(x,y,z)$ is obtained by a series of inversions, and a 3D millimeter wave holography image of the imaging target is finally obtained.

The above contents are described in light of the ideal embodiments according to this invention. Persons skilled in the art can make various modifications or alternatives to this invention without departing from the spirit of this invention. The technical scope of this invention is not limited to the contents in the specification, but must be determined according to the scope of the claims.

The invention claimed is:

1. A security check apparatus based on linear frequency modulation, the security check apparatus comprising:
a scanning device;
and
an image processing device,
wherein the scanning device comprises:
a plurality of detection seats;
a plurality of guideways;
a plurality of motors arranged on each of the plurality of detection seats; and
a set of millimeter wave signal transceiver devices that are arranged on each guideway of the plurality of guideways,
wherein the detection seats are each configured to accommodate a person to be security checked,
wherein each millimeter wave signal transceiver device is driven by a motor of the plurality of motors to move along a guideway of the plurality of guideways,
wherein the plurality of detection seats are arranged in longitudinal direction,
wherein the set of millimeter wave signal transceiver devices are configured to transmit millimeter wave signals to the person to be security checked and receive millimeter wave signals reflected from the person to be security checked, and
wherein the image processing device is configured to perform holographic 3D imaging on a human body of the person to be security checked based on the reflected millimeter wave signals to obtain a 3D image of the human body.

2. The security check apparatus of claim 1, further comprising:
an alarm device that is configured to perform operations comprising:
comparing the 3D image of the human body with a pre-stored standard safe human body 3D image;
determining when a match exists between the 3D image of the human body and the pre-stored standard safe human body 3D image; and
generating an alarm when the match does not exist.

3. The security check apparatus of claim 1, wherein each millimeter wave signal transceiver device comprises:
a plurality of millimeter wave signal transmitting devices and corresponding millimeter wave signal receiving devices,
wherein each millimeter wave signal transmitting device comprises a millimeter wave signal transmitting controller and a transmitting antenna connected to the transmitting controller,
wherein each millimeter wave signal receiving device comprises a millimeter wave signal receiving controller and a receiving antenna connected to the receiving controller,
wherein all the transmitting antennas of the millimeter wave signal transceiver device constitute a transmitting antenna array,
wherein all the receiving antennas of the millimeter wave signal transceiver device constitute a receiving antenna array, and
wherein each millimeter wave signal transceiver device moves on a guideway of the plurality of guideways in uniform motion around a body outline of the person to be security checked in a detection seat of the plurality of detection seats.

4. The security check apparatus of claim 3, wherein:
one or more of the plurality of guideways, associated with the detection seat, which are placed on a surface in contact with the human body, are called a rear detection guideway set, one or more other guideways of the plurality of guideways, which are arranged on a back of the detection seat facing a subsequent detection seat of the plurality of detection seats, are called a front detection guideway set, subsets of the millimeter wave signal transceiver devices are respectively arranged on the rear detection guideway set and on the front detection guideway set, the subset of the millimeter wave signal transceiver devices on the rear detection guideway set are configured to transmit and receive millimeter wave signals corresponding to a rear of the person to be security checked in the detection seat, and the subset of the millimeter wave signal transceiver devices on the front detection guideway set are configured to transmit and receive millimeter wave signals corresponding to a front of another person to be security checked in the subsequent seat.

5. The security check apparatus of claim 3,
wherein each millimeter wave signal transmitting device comprises:
a first independent signal source;
a first directional coupler;
a first power amplifier; and
a first frequency doubler,
wherein an output signal of the first independent signal source is sent to an input end of the first directional coupler,
wherein a straight-through output end of the first directional coupler is connected to an input end of the first power amplifier,
wherein an output end of the first power amplifier is connected to an input end of the first frequency doubler, and
wherein an output end of the first frequency doubler is connected to the transmitting antenna of the millimeter wave signal transmitting device.

6. The security check apparatus of claim 5,
wherein each millimeter wave signal receiving device comprises:
  a second independent signal source;
  a second directional coupler;
  a first mixer;
  a second power amplifier;
  a second frequency doubler;
  a second mixer;
  a third power amplifier;
  a third frequency doubler;
  a third mixer; and
  a low noise amplifier,
wherein an output signal of the second independent signal source is sent to an input end of the second directional coupler,
wherein a straight-through output end of the second directional coupler is connected to an intermediate frequency input end of the first mixer,
wherein a coupling port of the first directional coupler is connected to a radio frequency input end of the first mixer,
wherein a local oscillation output end of the first mixer is connected to an input end of the second power amplifier,
wherein an output end of the second power amplifier is connected to an input end of the second frequency doubler,
wherein an output end of the second frequency doubler is connected to a local oscillation input end of the second mixer,
wherein a radio frequency input end of the second mixer is connected to the receiving antenna of the millimeter wave signal receiving device,
wherein an intermediate frequency output end of the second mixer is connected to a radio frequency input end of the third mixer,
wherein a coupling port of the second directional coupler is connected to an input end of the third power amplifier,
wherein an output end of the third power amplifier is connected to an input end of the third frequency doubler,
wherein an output end of the third frequency doubler is connected to a local oscillation input end of the third mixer,
wherein an intermediate frequency output end of the third mixer is connected to an input end of the low noise amplifier,
wherein an output end of the low noise amplifier is connected to the image processing device.

7. The security check apparatus of claim 5, wherein the first independent signal source is a frequency modulation signal source with a working frequency in a range from about 18.5 GHz to about 21.5 GHz.

8. The security check apparatus of claim 6, further comprising:
a microcontroller; and
a single pole multiple throw switch connected to a power output end of a power supply device of the second independent signal source and the first independent signal source,
wherein the microcontroller is configured to control switching of the single pole multiple throw switch.

9. The security check apparatus of claim 6, wherein the second independent signal source is a dot frequency voltage-controlled oscillation source with a working frequency of about 50 MHz.

10. The security check apparatus of claim 6,
wherein the image processing device comprises:
  a data acquisition and processing device; and
  an image display device,
wherein the data acquisition and processing device is configured to acquire echo signals from the low noise amplifier and to obtain the 3D image of the human body of the person to be security checked by performing a Fourier transform and by performing an inverse Fourier transform, and
wherein the image display device is configured to display the 3D image.

11. The security check apparatus of claim 1, wherein in a detection seat of the plurality of detection seats, the guideways are arranged on surfaces that are in contact with the person to be security checked.

12. A security check method based on linear frequency modulation, the method comprising operations including:
driving, by a motor, millimeter wave signal transceiver devices on guideways to perform uniform linear motion;
transmitting, by a transmitting antenna in one of the millimeter wave signal transceiver devices, millimeter waves to a human body of a person to be security checked in a detection seat to perform millimeter-wave scanning on the human body;

receiving, by receiving antennas in the one of the millimeter wave signal transceiver devices, echo signals with target information reflected from the human body;

sending the echo signals to a data acquisition and processing device of an image processing device;

after sending the echo signals to the data acquisition and processing device of the image processing device, restoring, by the data acquisition and processing device, human body image information from the echo signals by performing a Fourier transform and by performing an inverse Fourier transform;

comparing the human body image information with a pre-stored standard safe human body 3D image to determine if a match exists between the human body image information and the pre-stored standard safe human body 3D image; and determining that the person to be security checked passes the security check when the match exists.

13. The security check method of claim 12, further comprising:

generating, by an alarm device, an alarm when the match does not exist.

14. The security check method of claim 12, wherein restoring the human body image information from the echo signals comprises operations including: calculating $f(x,y,z) = IFT_3\{FT_2 [E(X,Y,\omega)]e^{(jZ_0 K_z)}\}$, where:

$f(x,y,z)$ is the human body image information at point $(x,y,z)$ in a 3-dimensional coordinate system, $E(X,Y,\omega)$ is a time domain representation of the echo signals, X is an x-axis coordinate of a receiving antenna, of the receiving antennas, receiving the echo signals, Y is a y-axis coordinate of the receiving antenna receiving the echo signals, $\omega$ is an instantaneous angular frequency of the transmitting antenna, $FT_2$ represents a two-dimensional Fourier transform operation, $IFT_3$ represents a three-dimensional inverse Fourier transform operation, e is Euler's number, j is equivalent to $\sqrt{-1}$, $Z_0$ is a z-axis coordinate of the receiving antenna when the receiving antenna begins receiving the echo signals, and $K_z$ is the z-axis component of the transmitted millimeter waves.

* * * * *